(12) United States Patent
Ablabutyan

(10) Patent No.: US 8,706,361 B2
(45) Date of Patent: *Apr. 22, 2014

(54) METHOD AND APPARATUS FOR SELECTIVELY ACTIVATED POWERED ACTUATION OF A HYDRAULIC DRIVE SYSTEM

(71) Applicant: RS Drawings, LLC, Sante Fe Springs, CA (US)

(72) Inventor: Karapet Ablabutyan, Glendale, CA (US)

(73) Assignee: RS Drawings, LLC, Santa Fe Springs, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/955,975

(22) Filed: Jul. 31, 2013

(65) Prior Publication Data

US 2013/0317705 A1 Nov. 28, 2013

Related U.S. Application Data

(60) Continuation of application No. 13/529,058, filed on Jun. 21, 2012, now Pat. No. 8,521,370, which is a division of application No. 12/392,204, filed on Feb. 25, 2009, now Pat. No. 8,234,046.

(51) Int. Cl.
*B60P 1/02* (2006.01)
*B62D 65/18* (2006.01)
*B62D 25/24* (2006.01)
*B62D 33/02* (2006.01)
*B62D 33/04* (2006.01)
*B62D 39/00* (2006.01)
*B60N 3/00* (2006.01)
*B60N 99/00* (2006.01)

(52) U.S. Cl.
USPC ............. 701/49; 414/495; 414/592; 180/313; 280/1; 280/727; 280/760; 280/769

(58) Field of Classification Search
USPC ............ 701/50, 49, 36, 1; 414/539, 467, 495, 414/592; 296/56, 50, 57.1, 1.01; 49/324, 49/506; 180/315, 326–331, 313, 901; 280/1, 5.2, 446.1, 449, 657, 79.7, 280/79.11, 727, 760, 762, 769
See application file for complete search history.

(56) References Cited

U.S. PATENT DOCUMENTS 8,234,046 B2 * 7/2012 Ablabutyan .................... 701/49
8,521,370 B2 * 8/2013 Ablabutyan .................... 701/49

* cited by examiner

Primary Examiner — Christopher J Novosad
(74) Attorney, Agent, or Firm — Tutunjian & Bitetto, P.C.

(57) ABSTRACT

A method and apparatus for selectively activating a gravity down mode of a hydraulic system during operation of a lift gate. An electronic control circuit is added to hydraulic control circuitry and is configured to selectively interrupt the power down mode or gravity down mode of operation of the hydraulic system based on either a manual input (override) or a sensed condition and switch to the other mode of operation.

8 Claims, 12 Drawing Sheets

GRAVITY DOWN
WORKING DIAGRAM FOR POWER UNIT AND VALVES

| FUNCTION | PORT | MOTOR | SOLENOID OPERATION | | | | | RELAY | SWITCH |
| --- | --- | --- | --- | --- | --- | --- | --- | --- | --- |
| | | | VALVE "A" | VALVE "B" | VALVE "C" | VALVE "E" | VALVE "H" | R | SW |
| LIFT | B | ENERGIZED | – | – | – | – | – | – | POSITION 2 |
| LOWER | C | – | – | ENERGIZED | – | – | – | ENERGIZED | POSITION 2 |
| OPEN | J | ENERGIZED | ENERGIZED | – | – | ENERGIZED | ENERGIZED | – | POSITION 2 |
| CLOSE | A | ENERGIZED | – | – | – | ENERGIZED | – | – | POSITION 2 |

SEE VALVES ON POWER UNIT HYDRAULIC SCHEMATIC

FIG. 3

POWER DOWN

WORKING DIAGRAM FOR POWER UNIT AND VALVES

| FUNCTION | PORT | MOTOR | SOLENOID OPERATION ||||| RELAY | SWITCH |
| | | | VALVE "A" | VALVE "B" | VALVE "C" | VALVE "E" | VALVE "H" | R | SW |
|---|---|---|---|---|---|---|---|---|---|
| LIFT | B | ENERGIZED | – | – | – | – | – | – | POSITION 1 |
| LOWER | C | ENERGIZED | – | ENERGIZED | ENERGIZED | – | – | – | POSITION 1 |
| OPEN | J | ENERGIZED | ENERGIZED | – | – | ENERGIZED | ENERGIZED | – | POSITION 1 |
| CLOSE | A | ENERGIZED | – | – | – | ENERGIZED | – | – | POSITION 1 |

SEE VALVES ON POWER UNIT HYDRAULIC SCHEMATIC

FIG. 4

METHOD AND APPARATUS FOR SELECTIVELY ACTIVATED POWERED ACTUATION OF A HYDRAULIC DRIVE SYSTEM

CROSS REFERENCE TO RELATED APPLICATIONS

This application is a Continuation of co-pending U.S. patent application Ser. No. 13/529,058 filed on Jun. 21, 2012, which is a Divisional of U.S. patent application Ser. No. 12/392,204 filed on Feb. 25, 2009, now U.S. Pat. No. 8,234,046.

BACKGROUND

1. Field of Technology

The present invention relates to hydraulic systems. More particularly, it relates to the selective activation of a powered mode and/or a gravity mode for lowering a lift gate.

2. Discussion of Related Art

In a typical configuration, many hydraulic lift gate systems operate in a gravity down mode. "Gravity down" means that the force of gravity drives the lift gate from one position to another. For example, the lift gate platform may be driven by the force of gravity from a first upper position to a second lower position. The present disclosure, however, is not limited to this particular example. Any change in configuration of lift gate components that is driven by gravity, e.g., movement of the platform from a folded to an unfolded configuration, is considered a gravity down mode for the purposes of the present disclosure.

The gravity down mode consumes the least amount of energy as the weight of the gate lowers the platform to the ground. With light platforms and/or in cold weather, however, there can be problems with the platform lowering to the ground or traveling to the ground too slowly. Also, as the hydraulic oil becomes more viscous in cold temperatures, it will move more slowly through the system in the gravity down mode. This creates a problem for truck fleets operating in seasonal climates, as the fleet operator may have to incur the expense of changing the oil in the hydraulic lift system to a different viscosity depending on the season.

A conventional solution for customers with this issue is to purchase, at a higher price, a hydraulic liftgate system that applies hydraulic power both to raise and lower the platform. The use of hydraulic power to lower a platform is referred to as a "power down". The disadvantage of this alternate system is that the customer will not enjoy the benefits of energy savings of operating in a gravity down mode when power down is not necessary.

Other customers that do not operate in cold weather, may still benefit from a power down mode in certain circumstances. For example, the load on the platform increases the speed at which the lift gate platform lowers and a power down mode may not be needed depending on the weight of the load. However, when lowering an empty platform, particularly an aluminum or other lightweight construction platform, the driver may want a power down mode to speed up the lowering of the platform to save time.

As noted above, the power down system requires more components and consumes more energy, thereby using more battery power. Experience has taught that some customers can have an issue with the batteries running out of power before finishing their route. Thus, conserving battery power is an important issue, particularly for fleet operators with many stops and short routes. Accordingly, a system is needed that provides the option of a power down mode of operation when needed, but which also enables the conservation of battery power when it is determined that it is not needed.

SUMMARY

The present principles relate to structures for selecting between a "powered down" mode and a "gravity down" mode for actuating a hydraulic lift gate system, such as that used on delivery trucks. More particularly, the present principles relate to allowing for an automatic or manual activation of a power down mode for actuating a hydraulic lift gate system in conditions when non-powered, gravity driven movement produces substandard or otherwise undesirable performance.

According to an implementation, the hydraulic lift gate system includes an electronic control circuit configured to enable the selective activation of a power down mode of operation of the hydraulic lift gate system during the gravity down mode of operation of the lift gate.

According to another implementation, the method for controlling a hydraulic lift gate system includes sensing a condition during the gravity down mode of operation requiring a switch to power down mode of operation, and activating the power down mode of operation by switching from gravity down mode to power down mode upon a determination of the presence of the sensed condition.

The method further includes sensing at least one condition such as, for example, hydraulic fluid flow, fluid pressure, ambient temperature, fluid temperature and/or battery condition, determining whether the sensed at least one condition meets a predetermined threshold level, and generating a control signal when the sensed condition meets the predetermined threshold level, said control signal functioning to activate the power down mode.

According to yet another implementation, the method for controlling a hydraulic lift gate system includes sensing a condition during the power down operation requiring a switch to gravity down mode of operation, and activating the gravity down mode of operation by switching from power down mode to gravity down mode upon a determination of the presence of the sensed condition. The sensed condition may be, for example, hydraulic fluid flow, fluid pressure, ambient temperature and fluid temperature. Once a condition is sensed, it is determined whether the sensed condition meets a predetermined threshold level, and when it does, a control signal is generated to activate the gravity down mode.

Other aspects and features of the present principles will become apparent from the following detailed description considered in conjunction with the accompanying drawings. It is to be understood, however, that the drawings are designed solely for purposes of illustration and not as a definition of the limits of the present principles, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF DRAWINGS

In the drawings wherein like reference numerals denote similar elements throughout the views:

FIG. 3 is an exemplary working diagram of the power unit and valve operation during gravity down mode of the hydraulic system according to an implementation of the present principles;

FIG. 4 is an exemplary working diagram of the power unit and valve operation during power down mode of the hydraulic system according to an implementation of the present principles;

DETAILED DESCRIPTION

According to one implementation disclosed herein, the gravity down mode is set and then, when desired, the operator can activate a switch to run the gate in a power down mode. For example, in the case of trucks operating in cold or winter type weather, the operator may use the power down mode more often. In addition, if there is a load on the platform the power down mode will generally not be needed, but when the platform is empty the operator may want to activate the power down mode to speed up the lowering of the lift gate and save time.

A liftgate with a selectively activated (powered) lowering system is provided for lowering of the liftgate platform. According to an implementation, the system has two modes: 1) gravity down; and 2) power down. Gravity down may be used as desired to simply let gravity lower the platform.

Figure 1:
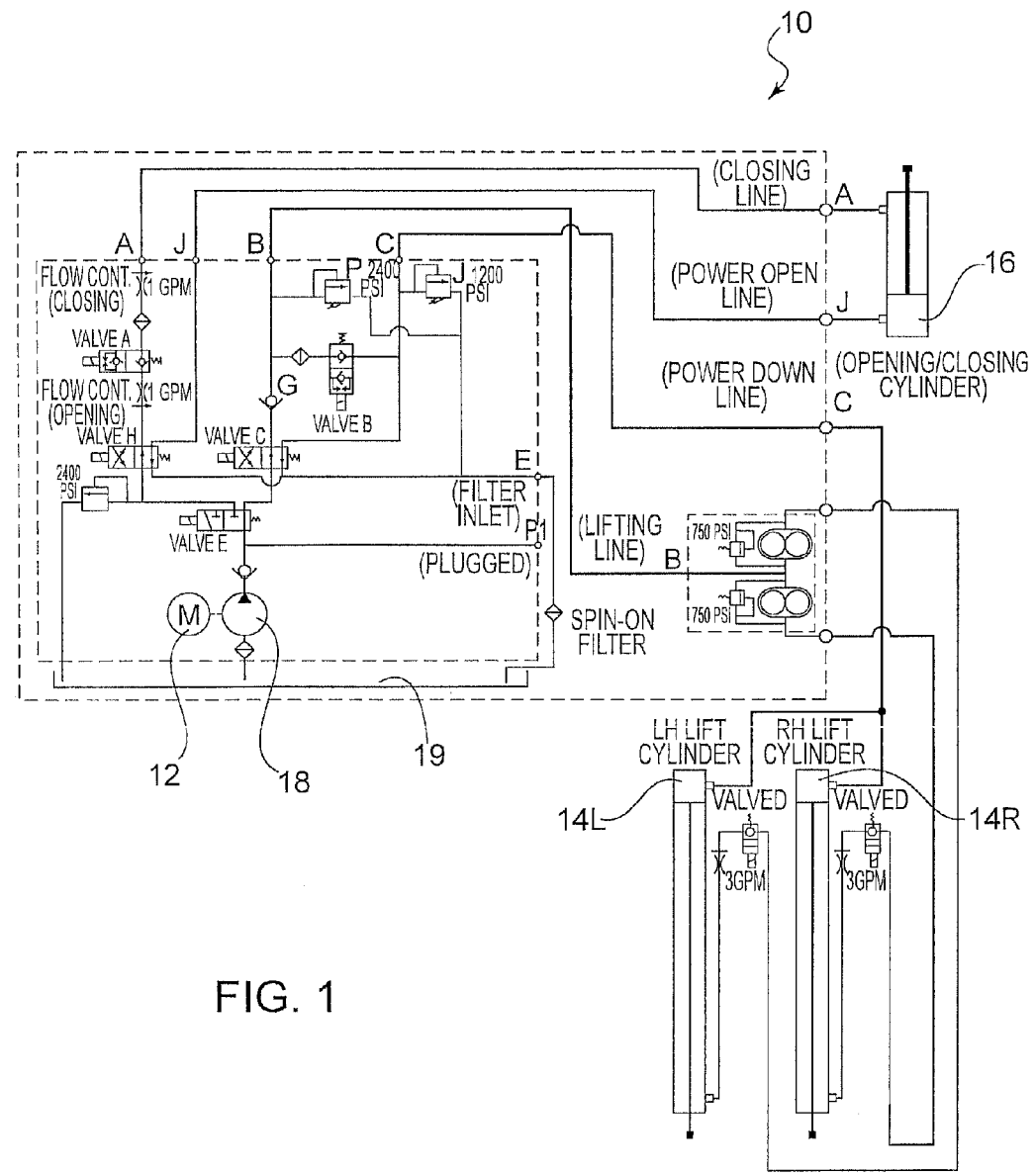
FIG. 1 is a single pump hydraulic schematic diagram of an exemplary hydraulic system.

Referring to FIG. 1 there is shown a hydraulic drive system 10 having a motor 12, a pump 18 and a plurality of solenoid valves (e.g., valve A, valve B, valve C, valve E and valve H) which control the flow (and direction) of hydraulic fluid through the various ports A, J, B, C and E. The ports are designated as follows: port A is for the closing line; port J is for the power open line; port B is for the lifting line; port C is for the power down line; and port E is a filter.

By way of example, the system 10 may have a cylinder 16 and at least one left and right cylinder 14L and 14R, respectively. Cylinder 16 opens/closes the gate, and cylinders 14L and 14R raise/lower the gate. Although shown in a particular configuration, those of skill in the art will recognize that cylinders 14L and 14R could be reversed to provide a pull/push operation rather than a push/pull operation, without departing from the scope of the present invention. Generally, an electrical system provides power to a motor and thereby a pump that forces fluid, e.g. oil, from a reservoir through a valve into a cavity of the cylinder within which a piston is disposed. When the piston begins in a first retracted position, the positive pressure exerted by the fluid on the butt end of the piston forces it out toward a second extended position. Conversely, when a piston is in an extended position, positive pressure exerted by fluid can force it into a retracted position. The piston in turn may be attached to another component that one desires to move in concert with the movement of the piston. For 14L and 14R: if the valve is closed, the piston will remain in its retracted position provided no other outlet is provided for oil exiting the cylinder. When one desires to extend the piston, one can open an outlet valve D, which allows oil to be forced out of the cavity of the cylinder by the weight of the piston and any load bearing on the piston. One of ordinary skill in the art will recognize that the viscosity of the oil, the temperature of the oil, total load on the piston and oil flow controls will be among the factors determining how fast the piston moves to an extended position.

According to one aspect of the present principles, a switch is provided that allows the operator to selectively activate a power down mode. The switch may be of a manual, electronic or solid state configuration. In the power down mode, a pump provides pressure to the upper cavity of the cylinder, which urges the oil into the cylinder at a faster rate than the pressure exerted by the piston alone. This switch may be used when, for example, the operator decides that the rate of the piston's extension is undesirably slow during gravity down mode.

Figure 2A:
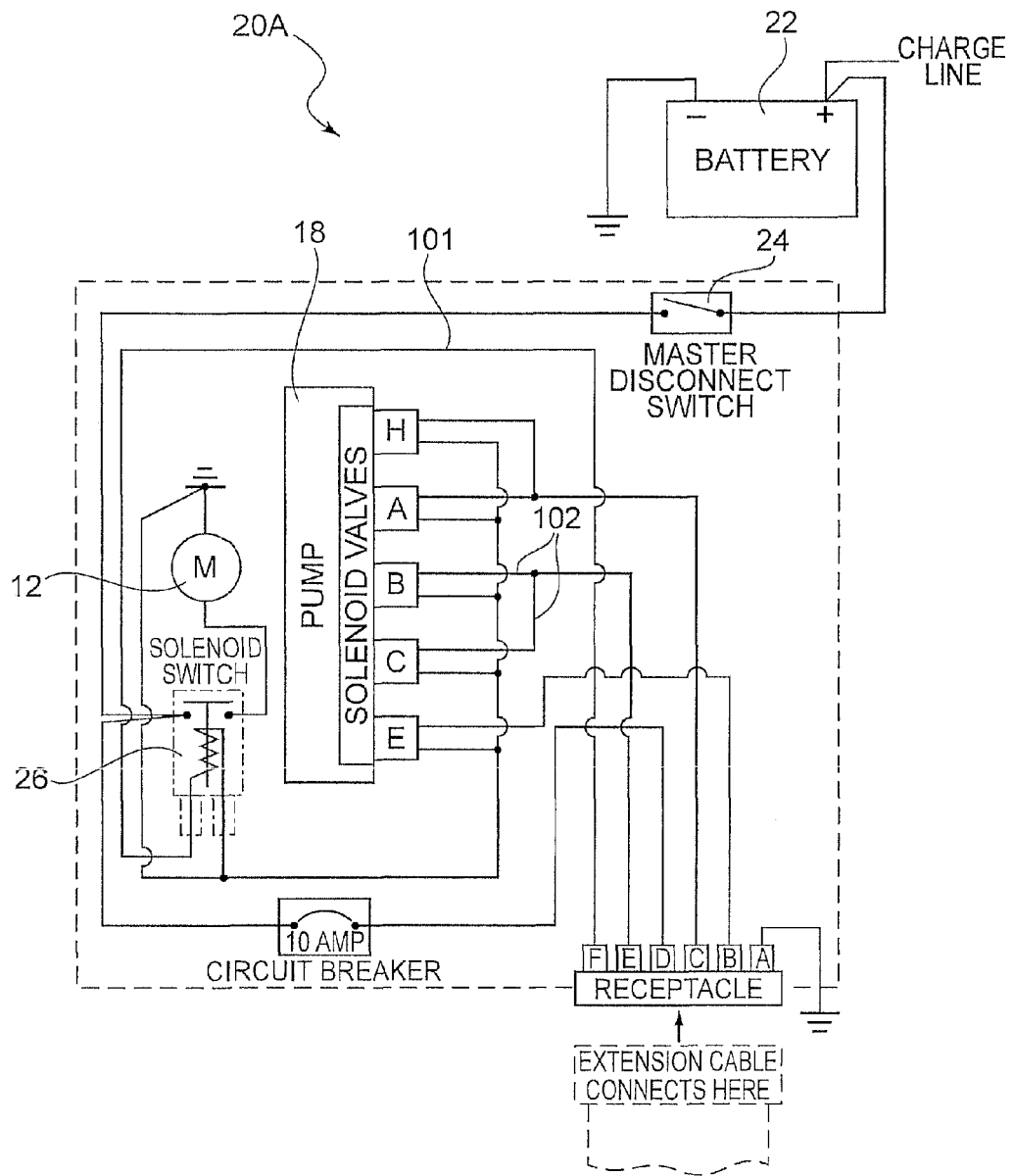
FIG. 2a is a partial electrical schematic diagram of the pump box electronic control of a hydraulic system according to known systems.

Referring to FIG. 2a, there is shown an electrical schematic of the control electronics 20a for the single pump hydraulic system shown in FIG. 1. As shown, a battery 22 is connected to the solenoid switch 26 via a master disconnect switch 24. Those of skill in the art of hydraulic systems will recognize the construction and operation of the single pump system depicted in FIGS. 1 and 2a, and understand that the present invention may be applied to multi-pump systems without departing from the scope of the same. By way of further example, a dual pump system can be configured where both pumps operated during the power down on demand of the present invention. Alternatively, in another configuration of a dual pump system, one pump can be used for gravity down and one for power down. Those of skill in the art will recognize that a switch or automatic sensor can be used to switch between pumps in a dual pump system without departing from the scope of the present invention.

Figure 2B:
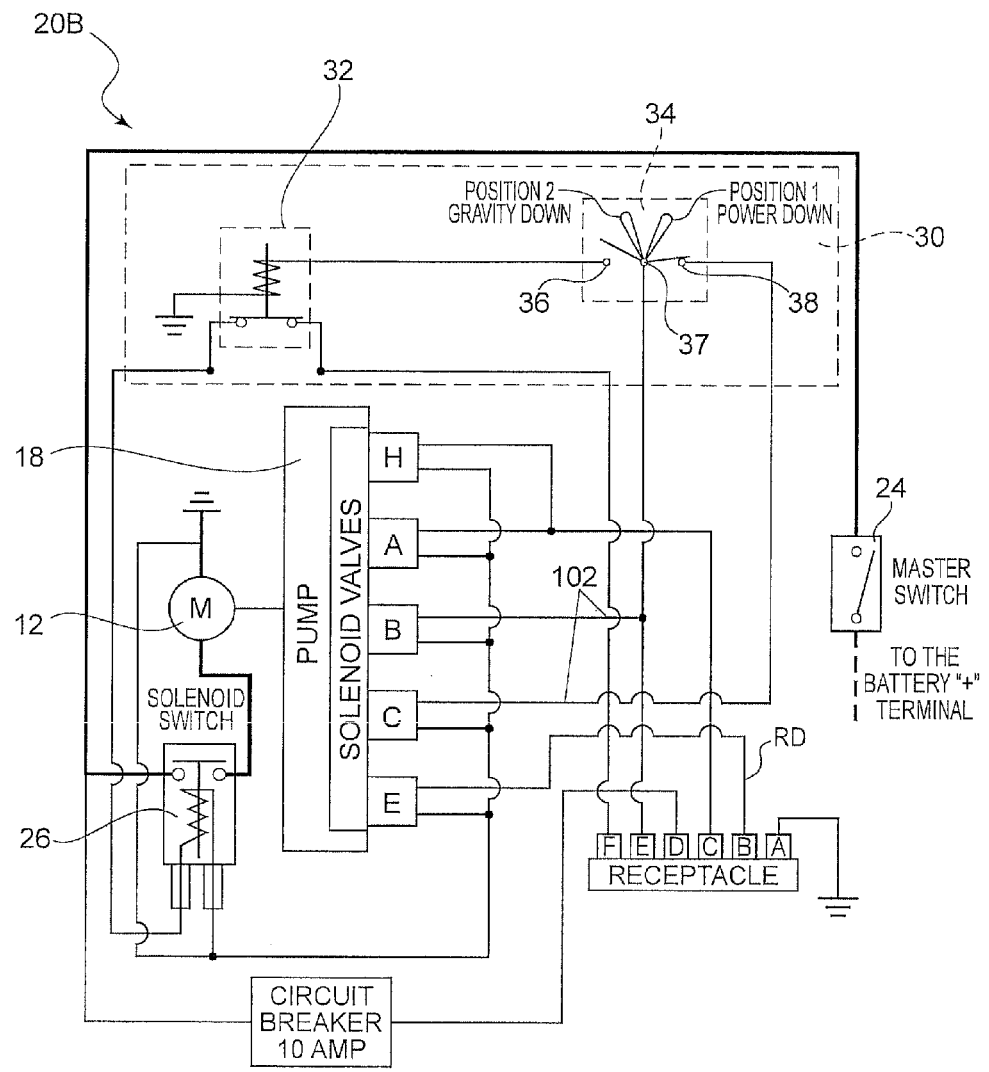
FIG. 2b is a modified electrical schematic of the electronic control of the hydraulic system according to an implementation of the present principles.
Figure 2C:
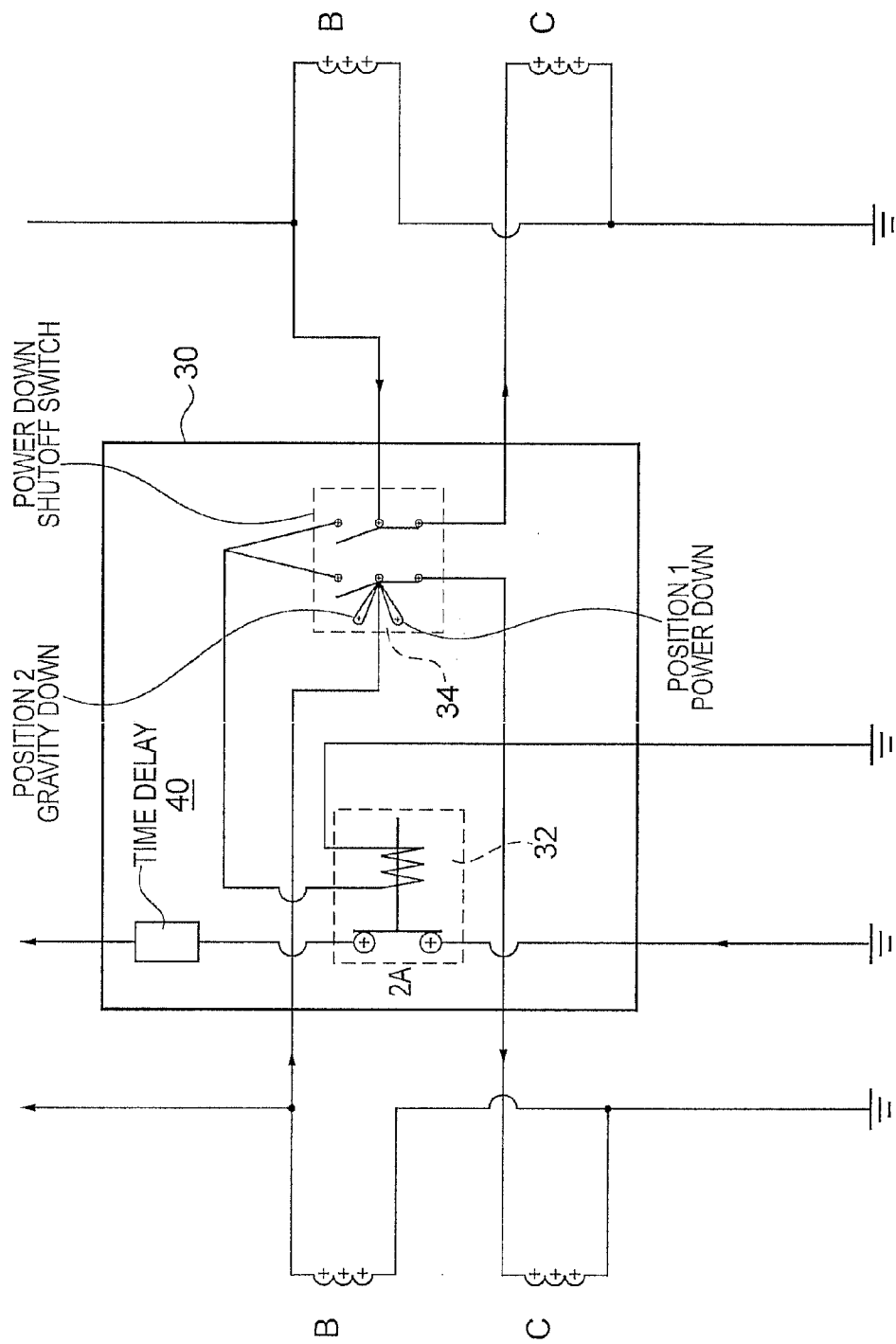
FIG. 2c is an exemplary schematic of the electronic control circuit implementing a delay circuit according to an implementation of the present principles.

FIG. 2b shows an electrical schematic diagram of the control electronics 20b according to an implementation of the present principles. As shown, gravity/power down control circuit 30 has been added to the schematic. The gravity/power down control circuit 30 includes a relay 32 and a two (2) position switch 34. The relay 32 has been added to the electrical connection (i.e., line 101) between the F connection on the receptacle and the control input of the solenoid switch 26. The solenoid switch 26 controls the activation/deactivation of the motor 12 and thereby pump 18 depending on the position of switch 34. The two (2) position switch 34 has a gravity down mode connector 36 connected to control input of the relay 32, a common (or neutral) connector 37 connected to the E port on the connection receptacle, and a power down mode connector 38 connected to one of the two connectors of solenoid valve C. FIG. 2c shows another embodiment of the electronic control circuit 30 implementing a time delay 40 described in more detail below.

The operation of gravity/power down system of the present invention will now be described with reference to FIGS. 2b, 3 and 4. When the switch 34 is in gravity down mode (Position 2), it disconnects the wire 102 from the C solenoid valve and connects the wire 102 from the B solenoid valve to relay 32 coil input.

Because the motor starter solenoid switch activation wire 101 is on the normally closed contact of the relay 32, every time the B solenoid valve receives electrical power it turns on the relay 32 and disconnects the wire 101 from the starter solenoid switch 26.

When the switch 34 is moved into the power down position (Position 1), then the B solenoid valve is connected to the C solenoid valve through the switch 34, and the relay 32 will not be energized. With this connection on power down function, the wire 101, which is connected to the normally closed contact of the relay 32, will energize the starter solenoid switch 26, which will turn on the motor 12, and because the C solenoid valve is energized it will change the direction of the hydraulic fluid flow (i.e., through port C) and thereby provides the desired powered lowering of the lift.

Figure 5:
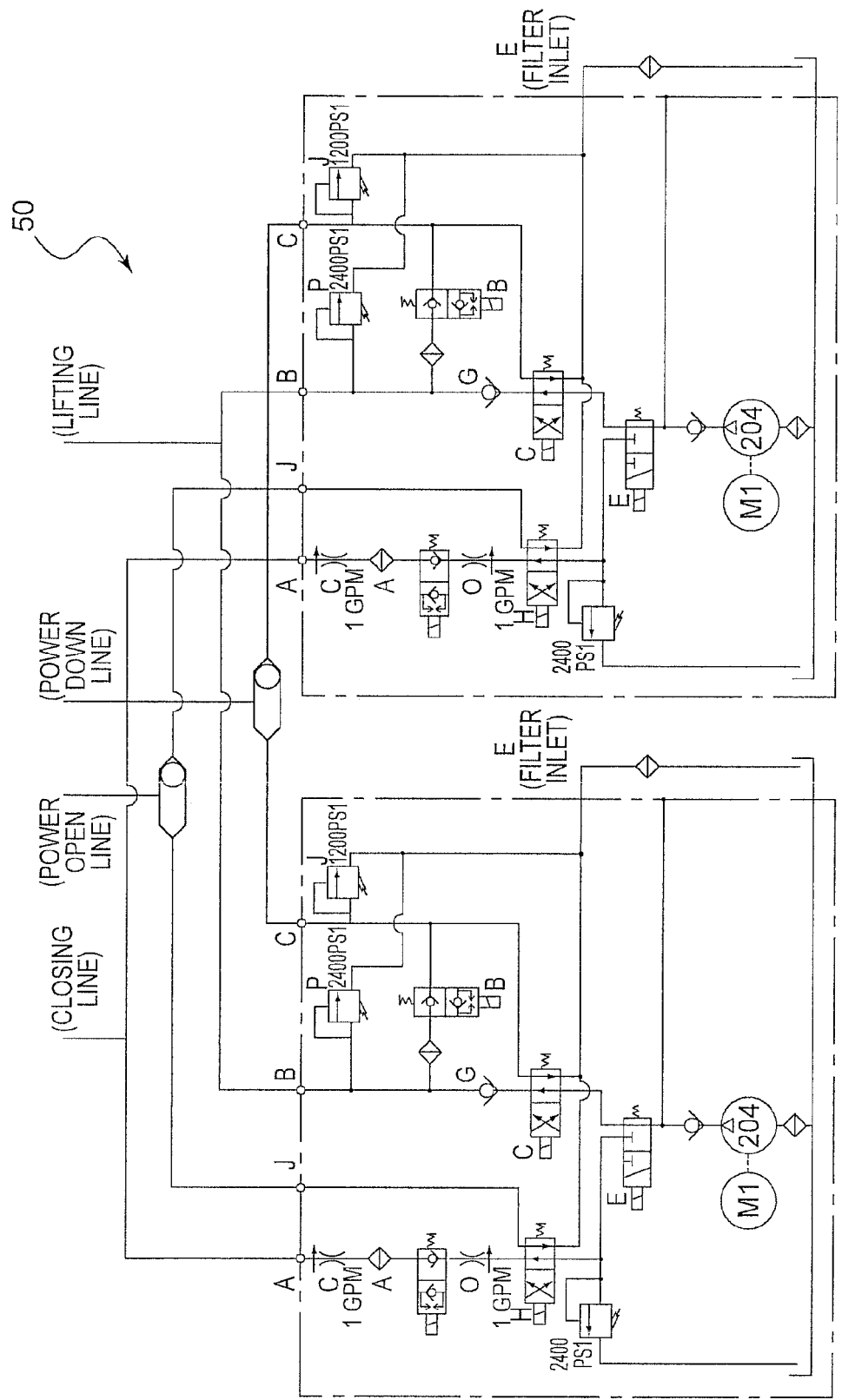
FIG. 5 is an exemplary schematic diagram of a hydraulic system including two hydraulic pumps.
Figure 6A:
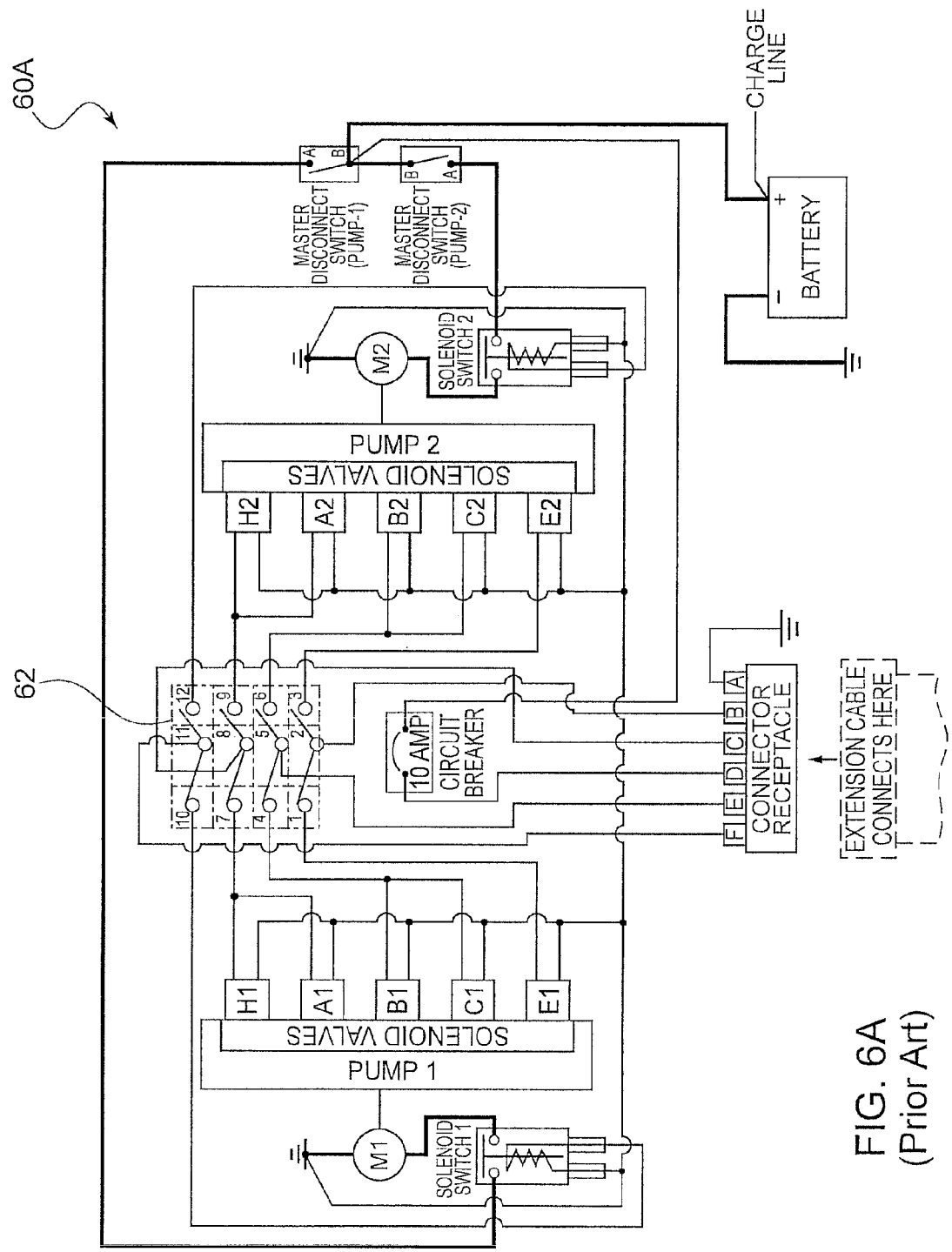
FIG. 6a is an electrical schematic diagram of the electronic control of a two pump hydraulic pump system according to known systems.

FIGS. 5 and 6a shows an example of a dual pump hydraulic system 50 and corresponding electrical schematic 60a for controlling the same. A selector switch 62 is provided to allow selection between motor 1 or motor 2, depending on the desired operation.

Figure 6B:
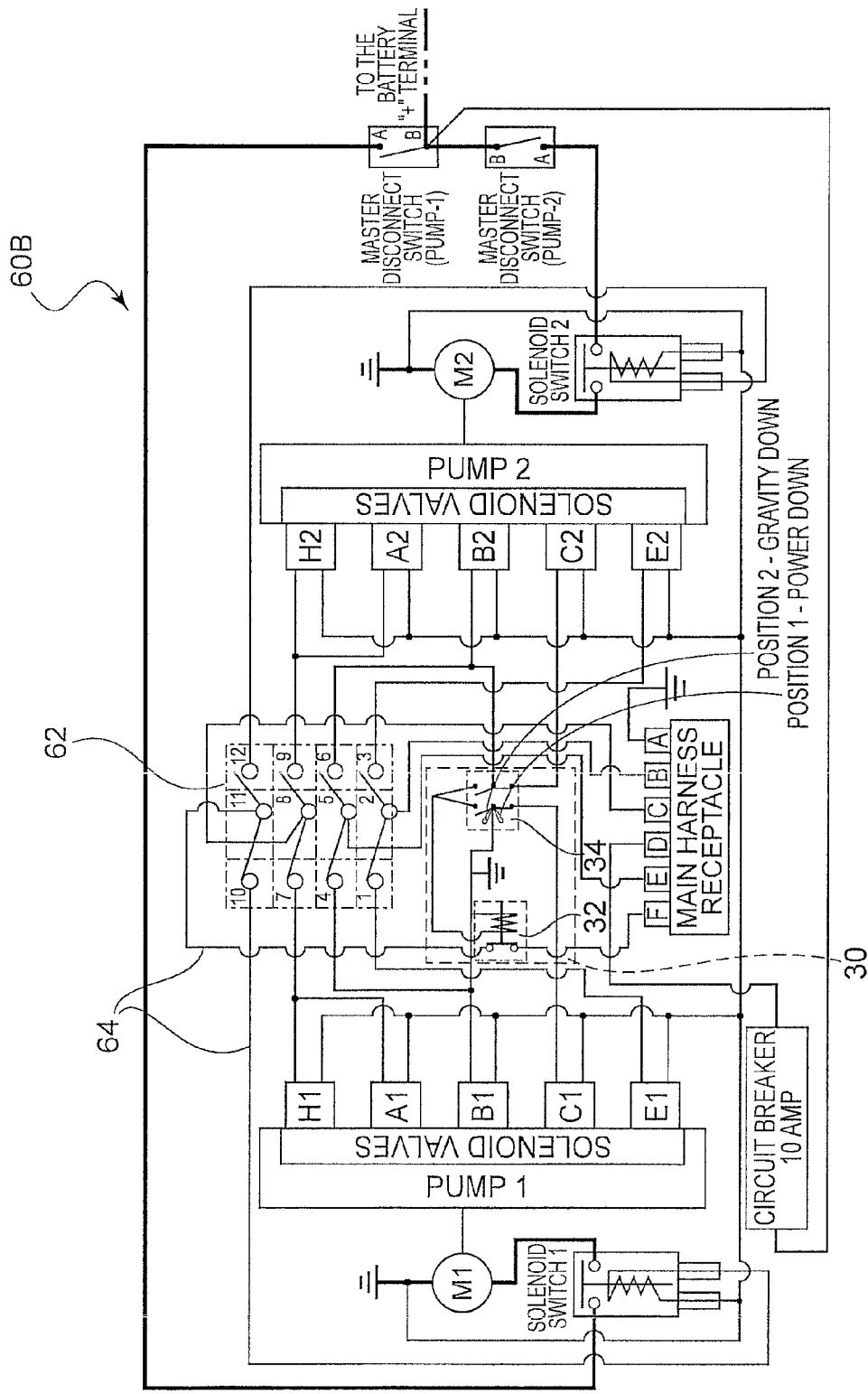
FIG. 6b is a modified electrical schematic diagram of the electronic control of the two hydraulic pumps in the system shown in FIG. 6 according to an implementation of the present principles.

FIG. 6b shows a modified electrical schematic 60b where the gravity/power down control circuit 30 has been added to the circuit. For gravity down mode, both B solenoid valves are open (i.e., on both of the two hydraulic systems) and the fluid flows back to the reservoir easier than when one valve is open and as a result, the lift platform will move down faster.

When the switch 34 is moved to the power down position then, the "B" solenoid valve will be connected to the "C" solenoid valve via the switch 34, and relay 32 will not be energized when the "B" solenoid valve is energized. With this connection on the power down function; wire 64, which is connected to the normally closed contact of relay 34, will energize the starter solenoid 26 which will turn on the motor 12, and because the "C" solenoid valve is energized it will change the direction of the oil flow and will create the desired power down scenario.

According to another aspect of the present principles, one or more sensors (e.g., a system of sensors) may be provided to trigger the power down mode automatically during gravity down mode, depending on various factors, or a combination thereof. Examples of such factors can be the speed of the platform, the weight of the platform and load, the temperature and/or pressure, fluid flow, the battery condition, etc.

Figure 2D:
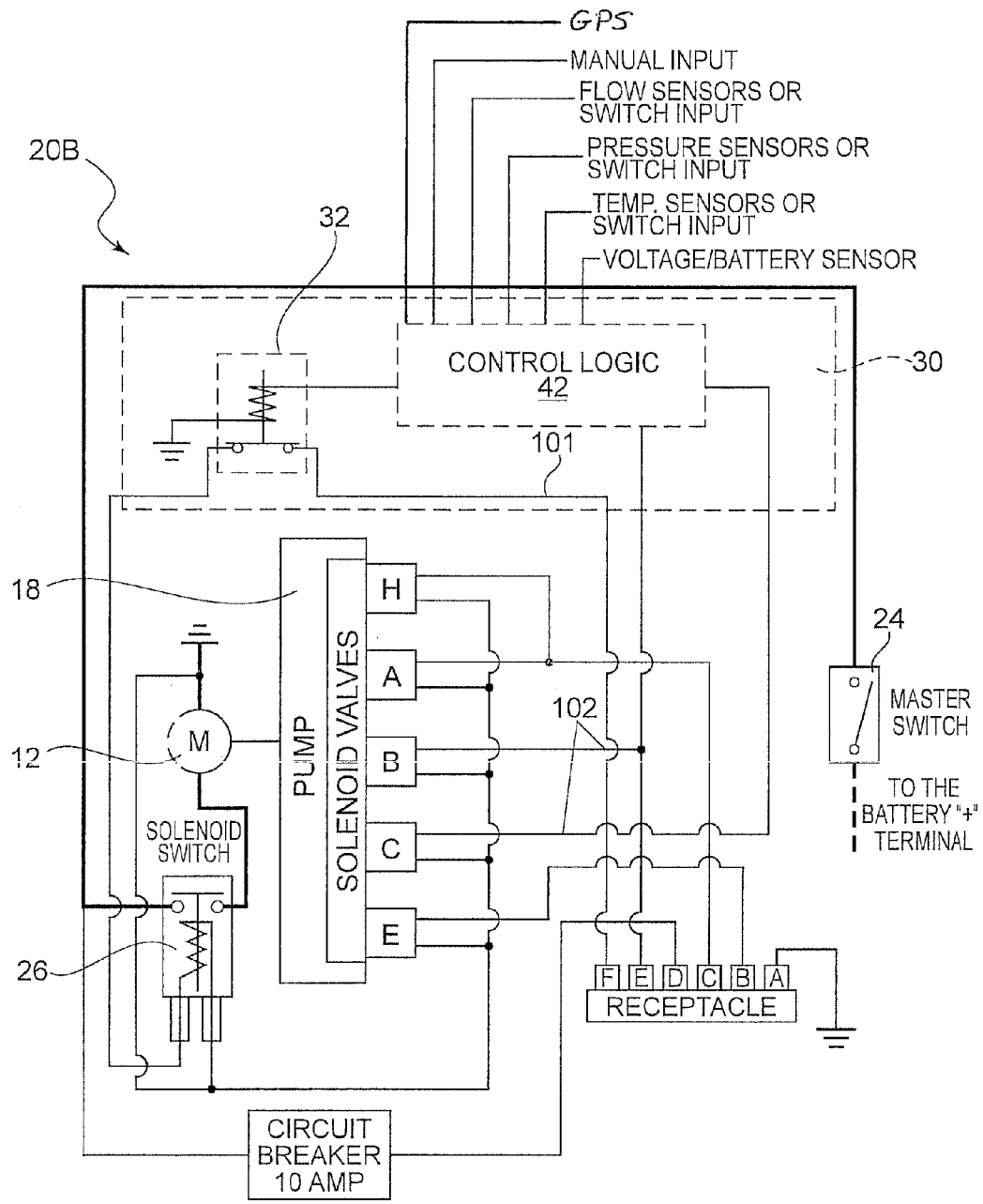
FIG. 2d is a modified electrical schematic of the electronic control of the hydraulic system according to an implementation of the present principles.

FIG. 2d shows various possible sensor or manual inputs to the electronic control circuit 30 according to an exemplary implementation. Those of skill in the art will recognize that circuit 30 may include further circuitry or control logic 42 replacing switch 34 for translating received sensor signals or manual input into a switching control signal depending on the desired application and/or implementation. The control logic can be any suitable circuitry working in conjunction with the sensors to provide the desired selective activation (i.e., manual or automatic) of the powered down mode of operation of the lift.

By way of further example, a speed sensor can be used to detect the speed of movement of the piston or platform in order to provide a control signal to activate the power down mode when the speed drops below a predetermined level. The speed sensor could be located, for example, in the cylinder and on the gate and could operate in any known manner (e.g., radar). Yet another example, a pressure sensor system may provide a control signal to activate the power down mode when the pressure in the cylinder speed drops below a predetermined level (e.g., pressure sensor could be located in the flow line after the flow control or anywhere in the flow line. In a further exemplary implementation, a temperature sensor system may provide a control signal to activate the power down mode when the temperature (ambient or in the cylinder) drops below a predetermined level. By way of example, if the temperature falls below 50° F., depending on the climate and/or particular use, the power down mode would be activated.

The temperature sensors could be disposed in multiple locations, for example, outside near the gate, but in one preferred implementation the temperature sensor can be located in the oil in the pump reservoir and cylinders. Those of skill in the art will appreciate that the placement of the temperature sensors will be a matter of design choice and can be anywhere in the system without departing from the scope of the present invention. Similarly, the control logic 42 could receive a switch input from a geographic positioning system (GPS) or geographic positioning sensor which can identify the lift location, measure the speed of the vehicle and based on predetermined criteria for specific geographic areas, the operation of the lift can be controlled. For example, if the GPS unit says the lift is operating in Nebraska, the system can: automatically change to the power down mode in winter months; reduce maintenance cycles to bring the lift in for service more often; and make a note to maintenance to use a thinner oil for the cold weather environment.

In yet another exemplary implementation, a battery condition sensor would sense how fast the battery voltage level drops when a load is added, and how fast the voltage recovers once the load is removed. In the event of a battery condition that is undesirable, the power down mode could be prevented and the lift would stay in the gravity down mode of operation.

Those of skill in the art will recognize that the types of sensors used and the positions of the same may vary without departing from the intended scope of the present principles.

Figure 7:
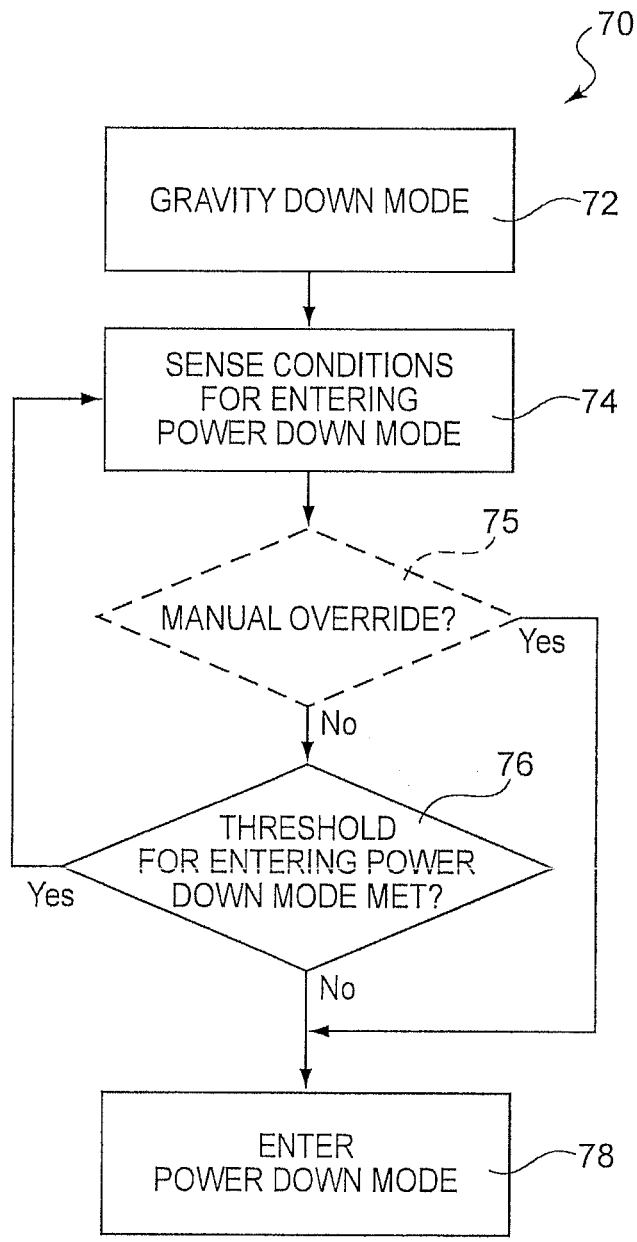
FIG. 7 is a flow chart of the method for entering power down mode according to an implementation of the present principles.

FIG. 7 shows a method 70 according to an implementation of the present invention. Initially, gravity down mode is started (either manually or by default). According to an implementation of the present invention, the gravity down mode can be entered upon start up of the system or at any time after an initially entered powered down mode. Once in gravity down mode, the possible conditions for entering the power down mode are then monitored 74 via the one or more sensors described above. A determination 76 is then made as to whether the threshold for a respective sensor has been met. When the threshold condition has been met, power down mode is entered 78. When the threshold condition is not met, the monitoring or sensing 74 of the conditions for entering power down mode is continued.

According to one implementation, the sensed condition 74 could be a manual override 75 by an operator. In this instance, the system will bypass all sensor threshold determinations and proceed directly to entering power down mode 78.

Figure 8:
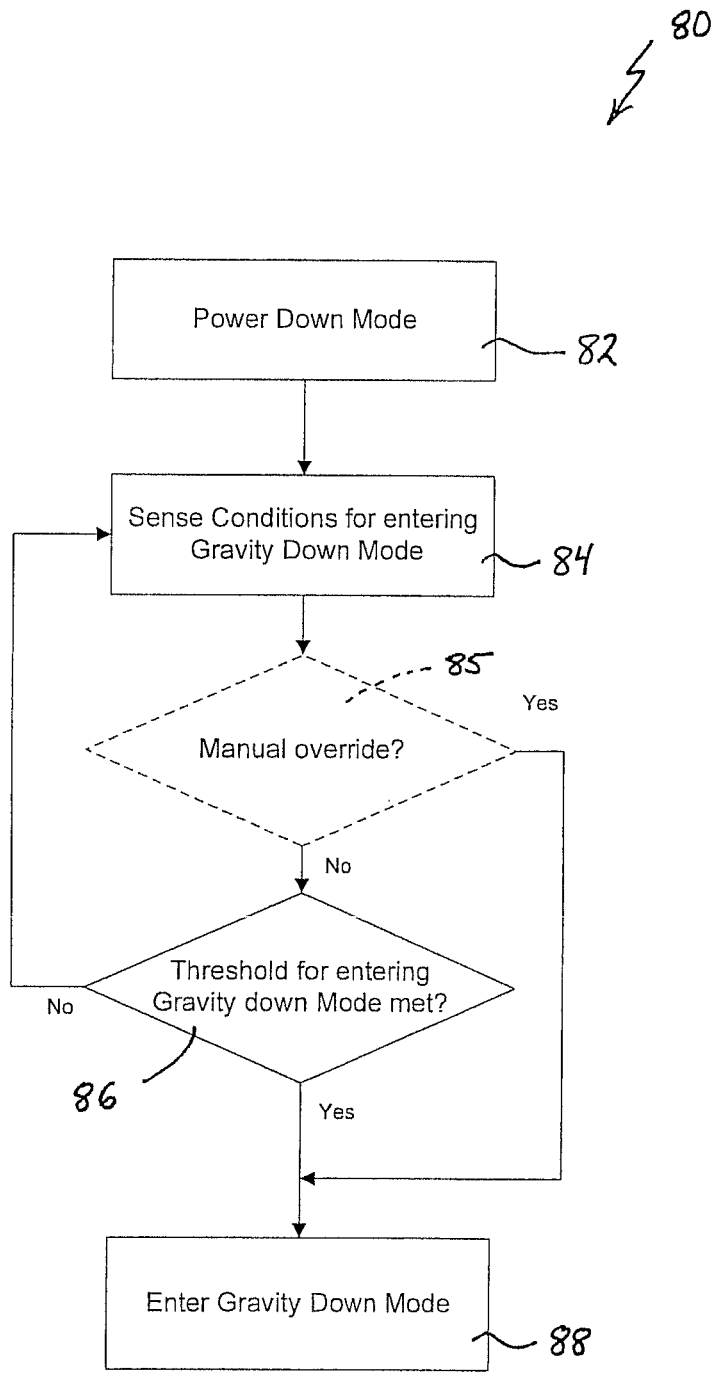
FIG. 8 is a flow chart of the method for entering gravity down mode according to an implementation of the present principles.

FIG. 8 shows a method 80 according to an implementation of the present invention. Initially, power down mode is started (either manually or by default). According to an implementation of the present invention, the power down mode can be entered upon start up of the system or at any time after an initially entered gravity down mode. Once in power down mode, the possible conditions for entering the gravity down mode are then monitored 84 via the one or more sensors described above. A determination 86 is then made as to whether the threshold for a respective sensor has been met. When the threshold condition has been met, gravity down mode is entered 88. When the threshold condition is not met, the monitoring or sensing 84 of the conditions for entering power down mode is continued.

According to one implementation, the sensed condition 84 could be a manual override 85 by an operator. In this instance, the system will bypass all sensor threshold determinations and proceed directly to entering power down mode 88.

In accordance with another implementation, the control electronics for the hydraulic system lift gate can be programmed to delay the start up of the pump/motor upon initial activation of the lift gate. This delay is preferably in a range of 1 ms-500 ms, but may have a longer range of 1 ms-5 seconds, for example, depending on the desired need and/or application. Those of skill in the art will appreciate that the delay may be considerably longer or shorter, and still be consistent with the intended scope of the invention.

This delay is useful in allowing the solenoids that need to actuate at the same time as the motor/pump to be at a full operating voltage when the pump motor kicks on. Those of skill in the art will recognize that when the pump motor turns on, the voltage in the system can drop across the solenoids, in which case the solenoids cannot activate as intended. When the solenoids do not have a proper operating voltage (i.e., the applied voltage is too low), the solenoid cannot actuate and can cause problems in the proper operation of the gate. FIG. 2c shows an exemplary implementation of the electronic control circuit 30 having a time delay circuit 40 coupled to one output leg of the relay 32.

Since the pump motor drags down the voltage such that the solenoids cannot operate simultaneously with the activation of the pump motor, the implementation of a slight delay at the start of the pump/motor, will enable the solenoids will to reach an appropriate operating voltage which is high enough to activate them. Once activated, the solenoids can hold in their operating position at the lower voltage after pump motor activation.

While there have been shown, described and pointed out fundamental novel features of the present principles, it will be understood that various omissions, substitutions and changes in the form and details of the methods described and devices illustrated, and in their operation, may be made by those skilled in the art without departing from the scope of the same. For example, it is expressly intended that all combinations of those elements and/or method steps which perform substantially the same function in substantially the same way to achieve the same results are within the scope of the present principles. Moreover, it should be recognized that structures and/or elements and/or method steps shown and/or described in connection with any disclosed form or implementation of the present principles may be incorporated in any other disclosed, described or suggested form or implementation as a general matter of design choice. It is the intention, therefore, to be limited only as indicated by the scope of the claims appended hereto.

What is claimed is:

1. A hydraulic lift gate system for a hydraulic lift gate attached to a vehicle, the system comprising:
   an electronic control circuit integrated into the system and being configured to enable activation of a gravity down mode of operation of the hydraulic lift gate attached to the vehicle at any time during a power down mode of operation, said activation of gravity down mode of operation is performed in response to a sensed condition that occurs during the power down mode of operation.

2. The hydraulic lift gate system according to claim 1, wherein the electronic control circuit comprises:
   a two position switch having a gravity down mode and a power down mode.

3. The hydraulic list gate system according to claim 2, wherein the electronic control circuit comprises:
   a relay having a control input and two connectors connected inline to a control line of the hydraulic system; and
   wherein the two position switch includes a gravity down connector connected to the control input of the relay and a power down connector connected to a power down line within the hydraulic system and a central connector connected to a hydraulic control connection receptacle.

4. The hydraulic lift gate system according to claim 3, wherein the electronic control circuit further comprises control logic configured to receive an input and generate a control signal in response to the received input.

5. The hydraulic lift gate system according to claim 1, further comprising at least one sensor for monitoring a condition of the hydraulic lift gate and generating a control signal for the electronic control circuit in response to the monitored condition.

6. The hydraulic lift gate system according to claim 5, wherein the monitored condition comprises at least one selected from a group consisting of geographic location of the lift gate system, hydraulic fluid flow, fluid pressure, ambient temperature, fluid temperature, battery condition and speed of lift.

7. The hydraulic lift gate system of claim 6, wherein said monitored condition further comprises a determination whether the monitored condition meets the predetermined threshold level, wherein when the monitored condition meets the predetermined threshold level, said control signal functions to activate the gravity down mode.

8. The hydraulic lift gate system according to claim 1, wherein the electronic control circuit further comprises a delay circuit configured to delay starting of a hydraulic pump/motor for a predetermined time period upon activation of the power down mode.

* * * * *